(12) United States Patent  (10) Patent No.: US 7,552,916 B1
Williams et al.  (45) Date of Patent: Jun. 30, 2009

(54) HYDRAULICALLY DAMPED MOUNTING DEVICE

(75) Inventors: Ian James Williams, West Bloomfield, MI (US); Michael Paul Rooke, Chippenham (GB); Peter Michael Trewhella Fursdon, Bradford on Avon (GB)

(73) Assignee: Cadillac Rubber & Plastics, Inc., Cadillac, MI (US)

( * ) Notice: Subject to any disclaimer, the term of this patent is extended or adjusted under 35 U.S.C. 154(b) by 0 days.

(21) Appl. No.: 12/108,687

(22) Filed: Apr. 24, 2008

Related U.S. Application Data

(60) Provisional application No. 60/914,343, filed on Apr. 27, 2007.

(51) Int. Cl.
  *F16F 9/10* (2006.01)
  *F16F 3/08* (2006.01)
(52) U.S. Cl. ............... 267/140.13; 267/219; 267/35
(58) Field of Classification Search . 267/140.11–141.7, 267/219; 180/300
  See application file for complete search history.

(56) References Cited

U.S. PATENT DOCUMENTS

| 4,352,487 | A | * | 10/1982 | Shtarkman | ................ | 267/35 |
| 4,671,227 | A | * | 6/1987 | Hollerweger et al. | .. | 267/140.13 |
| 4,681,306 | A | * | 7/1987 | Hofmann et al. | ........ | 267/140.13 |
| 4,697,793 | A | * | 10/1987 | Reuter et al. | ................ | 267/195 |
| 4,932,636 | A | * | 6/1990 | Phillips et al. | ......... | 267/140.13 |
| 5,060,917 | A | * | 10/1991 | DuBos et al. | .......... | 267/140.13 |
| 5,127,636 | A | * | 7/1992 | Spaltofski | .............. | 267/140.13 |
| 2006/0163785 | A1 | * | 7/2006 | Goudie | .................... | 267/141.5 |

FOREIGN PATENT DOCUMENTS

| EP | 0115417 A2 | 8/1984 |
| GB | 2282430 A | 4/1995 |

\* cited by examiner

*Primary Examiner*—Christopher P Schwartz
(74) *Attorney, Agent, or Firm*—McGarry Bair PC

(57) ABSTRACT

A hydraulically damped mounting device has a first anchor part in the form of a tube and a second anchor part in the form of a ring around the tube, which ring is connected to the tube by a resilient wall. The device has a working chamber for hydraulic fluid partially bonded by the resilient wall and connected to a compensation chamber by a passageway. The chamber is partially bounded by a flexible bellows which may have a ribbed surface. The first anchor part may also include a helmet extending over the flexible bellows, which helmet is in abutting non-bonded contact with the tube. The second anchor part may have components forming a support arc to which the resilient wall is attached and a radially inner positioning arc.

4 Claims, 3 Drawing Sheets

HYDRAULICALLY DAMPED MOUNTING DEVICE

CROSS-REFERENCE TO RELATED APPLICATION

This application claims the benefit of U.S. Provisional Patent Application Nos. 60/914,343, filed on Apr. 27, 2007, which is incorporated herein by reference in its entirety.

BACKGROUND OF THE INVENTION

1. Field of the Invention

The present invention relates to a hydraulically damped mounting device. Such a device usually has a pair of chambers for hydraulic fluid, connected by a suitable passageway, and damping is achieved due to the flow of fluid through that passageway.

2. Description of the Related Art

EP-A-0115417 and GB-A-2282430 discussed a type of hydraulically damped mounting device for damping vibration between two parts of a piece of machinery, e.g. a car engine and a chassis, referred to as a "cup and boss" type of mounting device, in which a "boss", forming one anchor part to which one of the pieces of machinery was connected, was itself connected via a deformable (normally resilient) wall to the mouth of a "cup", which was attached to the other piece of machinery and formed another anchor part. The cup and the resilient wall then defined a working chamber for hydraulic fluid, which was connected to a compensation chamber by a passageway (usually elongate) which provided the damping orifice. The compensation chamber was separated from the working chamber by a rigid partition, and a flexible diaphragm was in direct contact with the liquid and, together with the partition formed a gas pocket.

In the hydraulically damped mounting devices disclosed in the specifications discussed above, there was a single passageway. It is also known, from other hydraulically damped mounting devices, to provide a plurality of independent passageways linking the chambers for hydraulic fluid.

SUMMARY OF THE INVENTION

The present invention provides a number of improvements to the hydraulic mounting devices described above, which may facilitate manufacture, assembly and installation of the device while maintaining and preferably improving its performance.

Thus according to the present invention there may be provided a hydraulically damped mounting device for damping vibrations between two elements that vibrate relative to one another, the device having:

first and second anchor parts connected by a resilient wall, the first and second anchor parts each being attachable to a respective one of the elements;

a flexible bellows;

a working chamber at least partially bounded by the resilient wall, and a compensation chamber at least partially bounded by the flexible bellows; and a passageway interconnecting the working and compensation chambers to allow hydraulic fluid to move between them.

During assembly of the mounting device, the working chamber and compensation chamber are filled with hydraulic fluid. As a preliminary step, air is evacuated from the working and compensation chambers through a suitable evacuation orifice, normally in the compensation chamber. Subsequently, once the air has been evacuated, the hydraulic fluid is injected into the mounting device through the same orifice.

However, in some known devices, the process of evacuating the air may cause the deformable wall of the compensation chamber to close the evacuation orifice before the air has been wholly evacuated, trapping air within the mounting device. Such inefficient air evacuation may then lead to the formation of air pockets in the chambers, which could have a disadvantageous effect on the behaviour of the mount.

Hence, in a first development of the invention, the surface of the flexible bellows in ribbed. Such ribbing is positioned so as to prevent the material of the bellows closing the evacuation orifice. Thus, with such a ribbed bellows, evacuation of air from the mounting device prior to filling with hydraulic fluid may be made more efficient, thereby preventing air pockets being created in the hydraulic fluid.

The ribs present on the surface of the flexible bellows bounding the compensation chamber provide channels for the movement of air around the chamber.

Preferably, at least some of the ribs intersect.

In this development of the invention, it is preferred that the flexible bellows is annular and the ribs extend radially from the central opening. More preferably, a further set of ribs is provided that follows a circular path centred on the central opening of the bellows.

In this development of the invention, it is preferred that a protective helmet extends over the flexible bellows. Preferably, the helmet contains vent holes. Air will pass through the vent holes when the bellows are deformed.

In a second development of the invention, the first anchor part includes such a helmet and a tube, the helmet extending over the flexible bellows, and the second anchor part and the resilient wall each extending in an arc concentric with the tube, the helmet and tube being in abutting non-bonded contact.

In previous devices, the helmet and tube were adapted so as to allow them to be connected to each other. For example, the surface of the helmet was provided with a protrusion that could be fitted into a flared part of the tube to form a rigid joint. Complex manufacturing operations were required to form the flared tube and the protrusion, and an additional assembly step was required to affix the helmet to the tube.

In contrast, the configuration of the first development of the invention removes these requirements. The helmet and tube may simply be held together by a third component, preferably the component connecting the mounting device to the vehicle.

Most preferably, the helmet has an opening that is aligned with the opening of the tube, and the helmet and tube are connected by means of a bolt passing through them and connecting the mounting device to the vehicle. Such a structure represents another aspect of this development.

In this development of the invention, the second anchor part and the resilient wall preferably extend completely around the tube, so that the second anchor part is e.g. in the form of an annulus centred on the tube.

In this development of the invention, it is preferred that the helmet contains vent holes. Air will pass through the vent holes when the bellows are deformed.

In this development of the invention, the flexible bellows may be ribbed, as described in the first development of the invention, but this feature is optional.

In a third development of the invention, the mounting device has:

a first anchor part having a tube;

a second anchor part having a first component forming a support arc and a second component forming a positioning arc, the first and second components being connected together, the arcs each being concentric with the tube, the positioning arc lying radially inward from the support arc; and two resilient walls both attached to the first component of the second anchor part and each being attached to a different region of the first anchor part.

The function of second anchor part of the mounting device is to provide a positioning site (the positioning arc), which determines the position of the mounting device relative to one of the vibrating elements, and a support region (the support arc) that is the attachment site for the two resilient walls.

As previously mentioned, the tube forming the first anchor part is attached to one part of the structure to be damped via a bolt passing through that tube. The second component may be fixed to the second anchor part, but, in the type of mount with which the present invention is particularly concerned, it is often the case that the second anchor part is held resiliently onto the other component, by a spring force. That force may itself be derived from the clamping to the first component, so that there is sufficient force to hold the second anchor part is place relative to the second component, at least in the axial direction of the tube, however, in the radial direction, there may be less holding force. Therefore, the second anchor part needs to have a component resisting radial movement, to position the second anchor part appropriately relative to the component to which it is attached.

Since that positioning needs to be radially compact (since in general it will be done via an opening in the second component), the positioning site needs to be radially compact, in order to be receivable within the opening of the second component. However, the dimensions of the support region (particularly the radial dimension) are determined by the need to hold the resilient walls in a position that provides appropriate damping characteristics for the mounting device.

Hence, if the second anchor part were formed as a single component, it is likely that complex forming and/or moulding operations would be required in order to provide a compact positioning site and a support region of the appropriate dimensions to provide effective support for the resilient walls.

By contrast, in this development of the invention, the second anchor part is made from two components, the first component providing a positioning arc and the second component providing a support arc. By making the second anchor part from two components, simple manufacturing procedures may be employed.

Preferably, the two components making up the second anchor part are annular in shape. It is also preferred that the two components are connected by means of a projection provided on one component that is held in a groove provided in the other component.

In this development of the invention, it is preferred that the two resilient walls extend completely around the tube.

In this development of the invention, the flexible bellows may be ribbed, as described in the first development of the invention, but this feature is optional.

In this development of the invention, it is preferred that a protective helmet extends over the flexible bellows. Preferably, the helmet contains vent holes. Air will pass through the vent holes when the bellows are deformed. Preferably, the helmet is a portion of the first anchor part of the device.

In any of the developments of the invention, it is preferred that snubbers are provided on the inner surface of the working chamber, in order to limit the maximum extent of compression of the chamber.

In any of the developments of the invention, it is preferred that a rigid partition exists between the working chamber and the compensation chamber and contains the passageway connecting the two chambers.

The present invention is particularly, but not exclusively, concerned with a hydraulically damped mounting device for damping vibrations between the cab and body of a truck.

BRIEF DESCRIPTION OF THE DRAWINGS

Embodiments of the present invention will now be described in detail, by way of example, with reference to the accompanying drawings, in which.

DESCRIPTION OF THE PREFERRED EMBODIMENT

Figure 1:
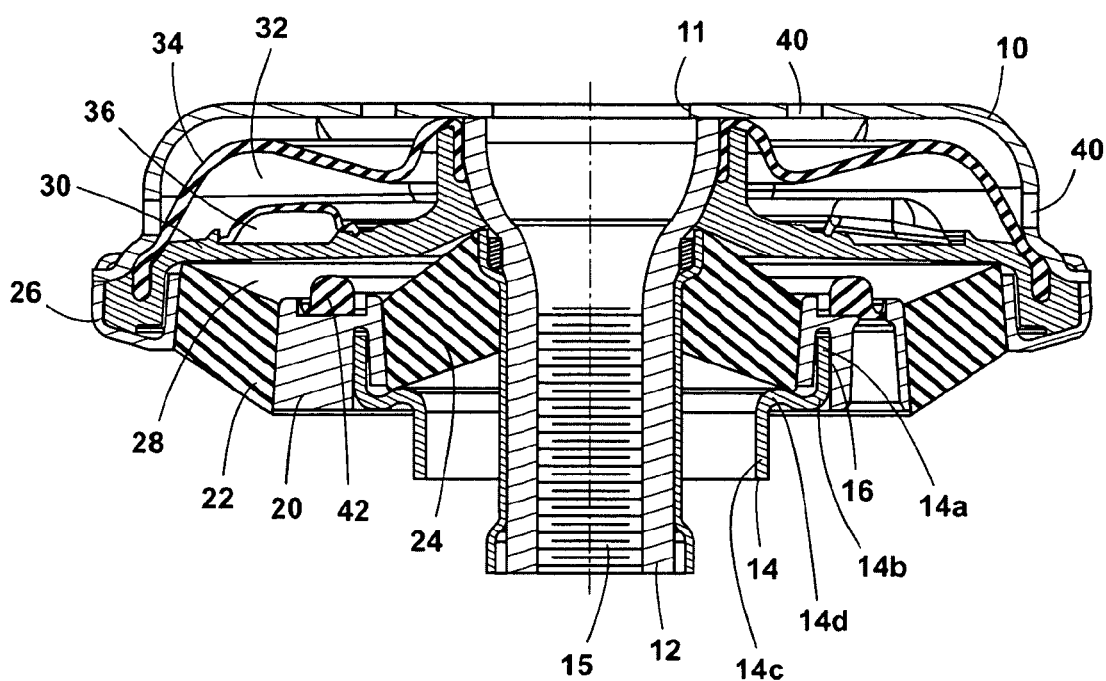
FIG. 1 is a cross-sectional view through a hydraulically damped mounting device according to the present invention.

FIG. 1 shows a first embodiment of a hydraulically damped mounting device according to the present invention, being designed for mounting between the rear of the cab of a truck, and the truck chassis, under the rear passenger area. That is an area where much body shake takes place. Traditionally, conventional rubber mounts are used in that location, but the present invention is derived from the idea of using a hydraulically damped mounting device at that location.

In the embodiment of FIG. 1, the hydraulically damped mounting device has a first anchor part formed by a rigid helmet 10, with an opening 11 therein. The opening 11 is aligned with the opening of a tube 12. The bore of the tube 12 then receives a bolt (not shown in FIG. 1) to secure the mounting device to e.g. the cab of a vehicle (not shown in FIG. 1).

The mounting device also has a second anchor part surrounding the tube 12 and comprising a base collar 14 and a rigid ring 20. The base collar 14 may provide an attachment site for connection of the mounting device to the chassis of the vehicle (again, not shown in FIG. 1).

The base collar 14 is connected at the side oriented towards the helmet 10 to the rigid ring 20. That connection is via a first part 14a of the base collar, which part 14a forms a support arc. The base collar also has a second part 14c forming a positioning arc around the sleeve 12. The first and second parts 14a, 14c are interconnected by curved parts 14c, 14d. The rigid ring 20 has a greater diameter than the second part 14a of the base collar 14. Two resilient (spring) walls 22 and 24 extend from the rigid ring 20. The first resilient wall 22 connects the rigid ring 20 to the helmet 10 via a fixing ring 26. The second resilient wall 24 connects the rigid ring 20 to the tube 12 and is formed at an incline to the tube 12, such that its orientation is opposed to that of the first resilient wall 22.

A rigid partition ring 30 is formed around the tube 12 and lies between the helmet 10 and rigid ring 20. A working chamber 28 and a compensation chamber 32 for hydraulic fluid are thus formed. The working chamber 28 is bounded by the resilient walls 22 and 24, the rigid ring 20 and the partition ring 30. The compensation chamber is bounded by the partition ring 30 and a flexible bellows 34. The working chamber and the compensation chamber are connected by a passageway 36 to permit hydraulic fluid to pass therebetween.

In use, if the cab to which the helmet 10 and tube 12 are attached, moves vertically downwards in FIG. 1 relative to the base collar 14, and hence the chassis of the vehicle, the resilient walls 22 and 24 are compressed, providing a spring action, and at the same time the volume of the working chamber 28 is reduced. Hydraulic fluid from the working chamber 28 is thus forced through the passageway 36 into the compensation chamber 32. The bellows wall 34 bounding the compensation chamber 32 deforms to permit the compensation chamber 32 to increase in volume, thereby to compensate for the decrease in volume of the working chamber 28. The movement of the hydraulic fluid through the passageway 36 provides a damping effect.

Similarly, if the helmet 10 and tube 12 move upwardly in FIG. 1, relative to the base collar 14, the volume of the working chamber 28 is increased, and hydraulic fluid passes from the compensation chamber 32 via the passageway 36 to the working chamber 28, again providing a damping effect.

In addition to a central opening 11, the helmet 10 contains vent holes 40 to allow air to be expelled when the flexible bellows 34 deforms to allow hydraulic fluid into the compensation chamber 32.

The rigid ring 20 is provided with snubbers 42 on the side bounding the working chamber 28. These act to limit travel of the rigid ring 20 towards the partition 30.

The operation of the hydraulically damped mounting device discussed above is generally conventional. The present invention provides a number of improvements to this device, which may facilitate its manufacture, assembly and installation while maintaining and preferably improving its performance.

The present invention seeks to provide a mounting device which may be easily manufactured and assembled. This is achieved by providing a helmet 10 and a tube 12 that are placed in abutting non-bonded contact. When the mounting device is in use, these two components are held together simply by the action of the bolt that passes through the tube 12 and the opening 11 in the helmet 10 and connects the mounting device to the vehicle. This arrangement avoids the need for complex forming operations to provide attachment points to allow the helmet 10 to be connected directly to the tube 12 and also avoids the need for an additional assembly step in which the helmet 10 is affixed to the tube 12.

The present invention also seeks to provide a mounting device with appropriate damping capability, but that may be easily connected to a vehicle. Hence, the device is provided with a base collar 14 that is formed separately from the rigid ring 20. The base collar 14 provides the connection site for the second anchor point of the mounting device, while the rigid ring 20 supports the resilient walls 22 and 24 in an appropriate position to give the required damping characteristics for the device. By forming the base collar 14 and rigid ring 20 separately, their diameters may be selected independently, so that the base collar 14 may be formed to provide a compact connection site, while the rigid ring 20 retains the required diameter to support the resilient walls 22 and 24.

The selection of a base collar 14 with a diameter close to that of the tube 12 not only provides a compact connection site for the device, but also limits radial travel between the connection site and the tube 12, so as to inhibit lateral vibration of the device.

The base collar 14 and the rigid ring 20 are connected by slotting the base collar 14 into a groove 16 running along the rigid ring 20.

The present invention also seeks to provide a mounting device in which air is evacuated efficiently from the compensation chamber 32 while this is being filled with hydraulic fluid during assembly of the device. Efficient evacuation of air is required in order to prevent the formation of air pockets in the chamber. Hence, in one embodiment of the invention, ribs are formed on the surface of the flexible bellows 34 that faces towards the compensation chamber. The ribs prevent the material of the flexible bellows 34 from closing the orifice (not shown) through which air is evacuated from the compensation chamber 32 and hydraulic fluid is subsequently injected. The ribs keep that orifice open, as previously discussed, so that efficient air evacuation can be achieved.

Figure 2:
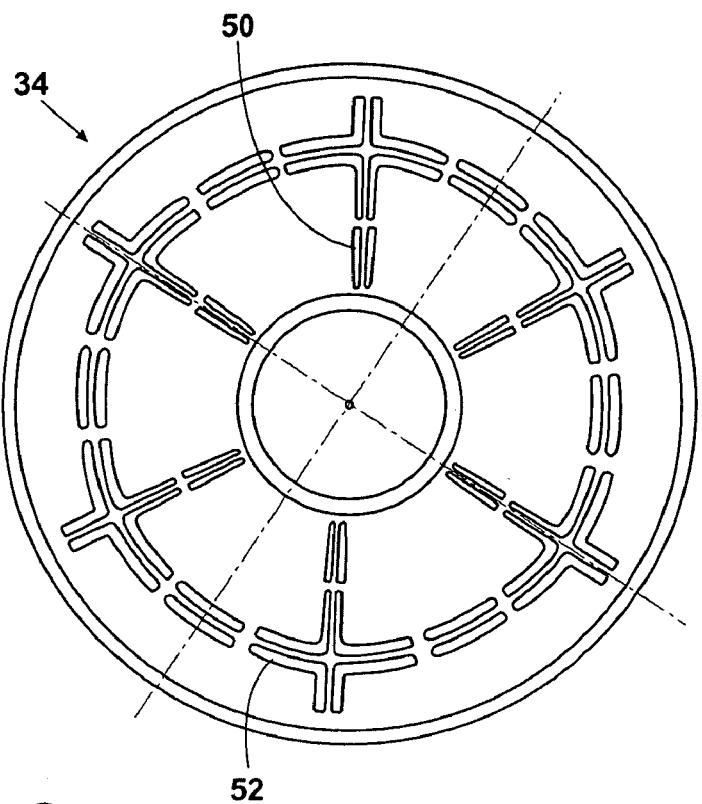
FIG. 2 is a view of an embodiment of part of the mounting device of FIG. 1.

FIG. 2 shows an embodiment of the flexible bellows wall 34 having ribs on one surface. One set of ribs 50 extends radially from the opening at the centre of the bellows. The other set 52 is formed as a circle that is concentric with the opening at the centre of the bellows.

Figure 3:
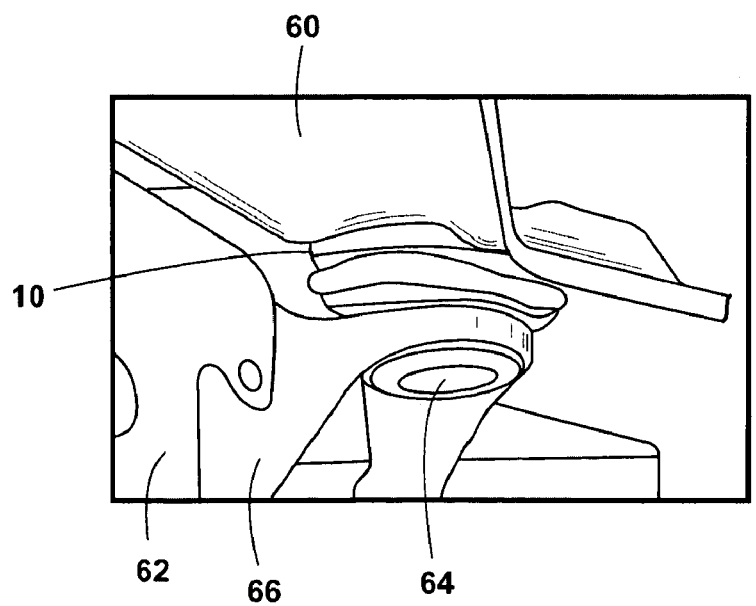
FIG. 3 shows the mounting device of FIG. 1 mounted on a vehicle.

FIG. 3 illustrates the mounting device of FIG. 1 mounted between part 60 of the cab of a vehicle, and part 62 of the chassis of the vehicle. The helmet 10 of the mounting device is secured to the part 60 by a bolt 64, which penetrates the bore 15 of the tube 12 and passes through a corresponding bore in the part 60. The base collar 14 is secured through bracket 66 on the part 62.

Figure 4:
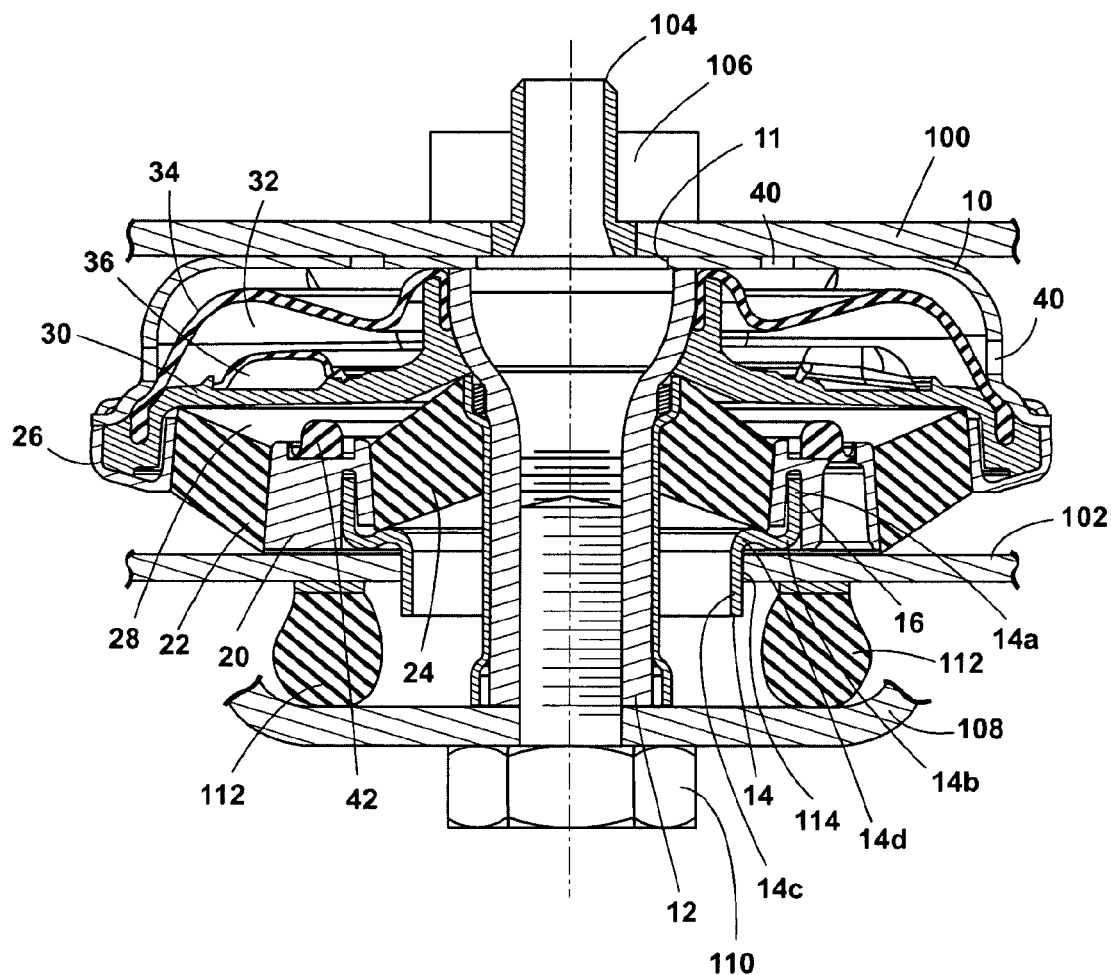
FIG. 4 shows in more detail the manner by which the mounting device is held in position.

FIG. 4 then shows the mounting device of FIGS. 1 to 3 when positioned in an appropriate location such as between an appropriate location between the rear of the cab or a truck body and the truck chassis. A first component 100 (part of the part 60 shown in FIG. 3) is fixed to the tube 12 and the other component 102 (part of the part 62 shown in FIG. 3) is held on the ring 20. Thus, a bolt 104 and has a nut 106 on its upper end. The component 100 is then clamped between the nut 106 and the helmet 10. Note that this clamping forces the helmet 10 onto the upper end of the tube 12 thereby simultaneously holding the helmet 10 onto the tube 12, with the same clamping force as the first component 100 is held on the helmet 10.

Moreover, as shown in FIG. 4, there is a plate 108 at the lower end of the tube 12, which is clamped thereto by the head 110 of the bolt 104. Resilient springs 112 then extend between that plate 108 and the second component 102, the effect of which is to force the second component 102 into abutment with the rigid ring 20. At least in the axial direction of the tube 12, the force imparted by the resilient springs 112 on the second component 102 are sufficient to hold that second component 102 firmly onto the rigid ring 20. Thus, in this state, vibrations between the first and second components 100, 102 are damped by the mounting device.

However, although the resilient springs 112 hold the second component 102 firmly on the rigid ring 20 in the axial direction, they are less efficient at holding it in place radially on the tube 12. Therefore, as previously described, the base collar 14 is used to prevent radial slippage of the rigid ring 20 relative to the second component 102. The second component 102 has an opening 114 therein, and the base collar 14 passes through that opening 114. Thus, the base collar 14 prevents radial movement of the second component 102, since any such radial movement will cause the second component 102 to press against one side or the other of the base collar 14, and that will be resisted by spring forces within the resilient walls 22, 24.

For such an arrangement to succeed, the opening 114 in the second component 102 is necessarily radially inward of the rigid ring 20, since the second component 102 must bear against a surface of that rigid ring 20 for the axial clamping achieved by the resilient springs 112 to have effect. Thus, the base collar 14 needs to have a smaller radial diameter than the rigid ring 20. This is achieved, in this embodiment, by making the base collar 14 as a separate component from the rigid ring, with at least the part of that base collar which projects from the rigid ring 20 having a smaller radius than the base collar. This simplifies the manufacture of the structure formed by the base collar 14 and the rigid ring 20, which forms the second anchor part of the mounting device of this embodiment.

Reasonable variation and modification are possible within the foregoing description and drawings without departing from the spirit of the invention, which is defined in the appended claims.

What is claimed is:

1. A hydraulically damped mounting device for damping vibrations between two elements that vibrate relative to one another, the device having:
   first and second anchor parts connected by a resilient wall, the first and second anchor parts each being attachable to a respective one of the elements;
   a flexible bellows;
   a working chamber at least partially bounded by the resilient wall, and a compensation chamber at least partially bounded by the flexible bellows; and
   a passageway interconnecting the working and compensation chambers to allow hydraulic fluid to move between them; wherein:
   the first anchor part includes a helmet and a tube, the helmet extending over the flexible bellows, and the second anchor part and the resilient wall each extending in an arc concentric with the tube, the helmet and tube being in abutting non-bonded contact.

2. A hydraulically damped mounting device according to claim 1, wherein: the helmet has an opening that is aligned with the opening of the tube, and the helmet and tube are connected by means of a bolt passing through them.

3. A hydraulically damped mounting device for damping vibrations between two elements that vibrate relative to one another, the device having:
   first and second anchor parts connected by a resilient wall, the first and second anchor parts each being attachable to a respective one of the elements;
   a flexible bellows;
   a working chamber at least partially bounded by the resilient wall, and a compensation chamber at least partially bounded by the flexible bellows; and
   a passageway interconnecting the working and compensation chambers to allow hydraulic fluid to move between them; wherein:
   the first anchor part is a tube;
   a second anchor part has a first component forming a support arc and a second component forming a positioning arc, the first and second components being connected together, the arcs each being concentric with the tube, the positioning arc lying radially inward from the support arc; and
   said resilient wall comprises two resilient walls both attached to the first component of the second anchor part and each being attached to a different region of the first anchor part.

4. A hydraulically damped mounting device according to claim 3, wherein the first and second components are annular.

* * * * *